United States Patent [19]

Nichols et al.

[11] 4,373,486

[45] Feb. 15, 1983

[54] ROTATIONAL POSITION AND VELOCITY SENSING APPARATUS

[75] Inventors: Gary R. Nichols, Woodburn, Ind.; John J. Kozlowski, Jr., Margate, Fla.

[73] Assignee: Magnavox Government and Industrial Electronics Company, Fort Wayne, Ind.

[21] Appl. No.: 223,779

[22] Filed: Jan. 9, 1981

[51] Int. Cl.[3] ........................ F02P 5/04; G01M 15/00

[52] U.S. Cl. ........................ 123/414; 73/116; 123/617; 123/643

[58] Field of Search ........ 123/414, 416, 417, 612-617, 123/643; 324/173, 174, 207, 208; 310/70 R, 154, DIG. 3; 73/116, 117.3, 119 R

[56] References Cited

U.S. PATENT DOCUMENTS

| | | | |
|---|---|---|---|
| 3,366,909 | 1/1968 | Hini et al. | 338/32 |
| 3,875,920 | 4/1975 | Williams | 123/617 |
| 3,881,453 | 5/1975 | Harper et al. | 123/490 |
| 3,921,610 | 11/1975 | Hartig | 123/416 |
| 3,923,022 | 12/1975 | Scholl | 123/146.5 A X |
| 4,086,533 | 4/1978 | Ricovard et al. | 324/208 |
| 4,086,894 | 5/1978 | Capurka et al. | 123/613 |
| 4,109,630 | 8/1978 | Richeson, Jr. et al. | 123/617 |
| 4,165,726 | 8/1979 | Helmer, Jr. | 123/146.5 A |
| 4,204,158 | 5/1980 | Ricovard et al. | 324/208 |
| 4,250,846 | 2/1981 | Menard | 123/643 X |
| 4,262,526 | 4/1981 | Makita et al. | 73/116 |
| 4,267,470 | 5/1981 | Kawakami et al. | 123/414 X |
| 4,313,414 | 2/1982 | Planteline | 123/617 X |

*Primary Examiner*—Tony M. Argenbright

*Attorney, Agent, or Firm*—Thomas A. Briody; William J. Streeter; Richard T. Seeger

[57] ABSTRACT

A ferrous disk is rotatably driven by an internal combustion engine shaft. The disk has outer and inner circular rims projecting outwardly from one side thereof. The outer rim has two arcuate notches of predetermined arcuate length and position and the inner rim has three arcuate notches of predetermined arcuate length and position. A permanent magnet is mounted between and radially spaced from two Hall-effect sensor devices in fixed relation to the shaft axis such that the outer rim passes between one Hall-effect device and the magnet and the second rim passes between the second Hall-effect device and the magnet as the shaft is rotated. The notches are so positioned to provide four separate two digit binary outputs to a microcomputer that provides output signals to ignition coil drivers for the spark ignition devices of the engine and provides spark advancement and coil dwell time variation in accordance with shaft rotational speed and other engine operating conditions.

22 Claims, 13 Drawing Figures

ROTATIONAL POSITION AND VELOCITY SENSING APPARATUS

RELATED APPLICATION

The application is related to commonly-assigned copending application Ser. No. 105,697, filed Dec. 20, 1979, by Ronald J. Kiess and Gary R. Nichols and entitled "Magnetic Sensor for Distributorless Ignition System", now abandoned, and the copending continuation-in-part application Ser. No. 06/223,778, filed Jan. 9, 1981, and entitled "Magnetic Sensor for Distributorless Ignition System and Position Sensing", of that application, the disclosures of such applications being incorporated herein by reference.

BACKGROUND OF THE INVENTION

This invention is in the field of rotational position and velocity sensing for a rotatable shaft and more particularly to an internal combustion engine crankshaft or camshaft position and velocity sensing and output device for driving the coils for spark ignition devices in the engine cylinders of such engine.

In previous systems for controlling the ignition coil drivers for spark ignition devices in an internal combustion engine, mechanical devices such as the well known distributor system having a camshaft driven distributor arm and arcuately spaced contacts were used to energize an ignition coil and high voltage pulses to the spark ignition devices, commonly known as spark plugs, in each cylinder. A cam on the distributor arm shaft operated a pair of contacts, or "points", to deliver a low voltage pulse to the ignition coil for each high voltage pulse to the spark plugs. This system required frequent maintenance, adjustment, and part replacement.

Other systems have been devised, some utilizing Hall-effect sensors and rotors with magnetic sensing devices, to provide a distributorless ignition system but have not found general use due to inherent system expense and operation limitations.

SUMMARY OF THE INVENTION

A ferrous rotor or disk is rotatably driven by the vehicle crankshaft or camshaft. Outer and inner circular rims are formed on a disk side and project outwardly therefrom. The outer rim has two arcuate notches of predetermined arcuate length and position, and the inner rim has three arcuate notches of predetermined length and position. A permanent magnet is mounted between and radially spaced from two Hall-effect sensors in fixed relation to the shaft axis, the magnet being between the sensors to provide a first radial space or air gap between the first sensor and the magnet, and a second radial space or air gap between the second sensor and the magnet. The outer rim, and its notches, pass through the first gap, and the inner rim, and its notches, pass through the second gap, as the shaft turns. Presence of a notch in its respective gap will permit flux communication in that gap between the magnet and the respective Hall-effect sensor, and presence of a rim in its respective gap will shunt the flux in that gap, preventing such flux communication. Flux communication between the magnet and a given sensor will cause a high sensor output level, or binary "1", and absence of such flux communication will cause a low sensor output level, or binary "0". As described in the aforementioned copending application, four binary outputs (0,0; 0,1; 1,0; and 1,1;) are possible with the above magnetsensor assembly, which per se is a part of that application. If desired, as mentioned in that application, the sensor outputs may be inverted as with the circuitry packaged with the sensor manufactured by Sprague Electric Co., part no. UGS-3020T.

The notches are placed in their respective rims to provide two digit binary signals, which when processed by a microcomputer, are indicative of the rotational position and velocity of the shaft to produce output signals to coil drivers for the ignition coils in a multi-cylinder internal combustion engine. The microcomputer, by recognizing transitions from one binary combination to another combination, provides the proper signals in the proper sequence to the coil drivers for the ignition coils for desired firing sequence of the spark ignition devices. The microcomputer counts the number of sensor outputs of a given time period, to determine shaft revolutions per minute (rpm) information, and processes this information together with other computer inputs as to engine operating conditions, such as intake manifold pressure, throttle position, atmospheric pressure, coolant temperature, exhaust gas chemical content, and recirculation valve position, to provide signals to control coil dwell time and advance the timing of the spark ignition in each cylinder relative the top dead center position of the piston in the cylinder, and to control other engine components such as the fuel injection quantity and timing or the carburetor mixture. With this invention, a maximum of one cylinder during engine start is passed before the computer is ready to provide a coil drive signal.

Further, the microcomputer, during low shaft rpm, examines the binary output levels shortly after a binary level transition to verify the direction of shaft rotation, and if the shaft is rotating in the wrong direction, as it would be in a "back-up" of the shaft during start of the engine, no ignition signals are provided until the correct shaft rotation is sensed. Incorrect shaft rotational direction is sensed in less than one revolution of the shaft. Correct shaft rotation is sensed in time to permit the earliest spark ignition signal generated by the computer.

The sensing and control apparatus of this invention may be used in fuel injection engines and diesel engines to control injection quantity and timing, and in such application, the disk would be driven by the camshaft.

Thus, it is an object of this invention to provide a shaft rotational position and velocity sensing apparatus that is relatively simple and inexpensive in manufacture, and is durable in use, that is capable of accurately sensing rotational position and angular velocity.

Another object of this invention is to provide apparatus of the previous object having a disk with outer and inner circular rims, each rim having a plurality of arcuate notches, with each rim passing through a region of magnetic flux, the regions being defined by a magnet placed between two Hall-effect sensors.

A further object of this invention is to provide with the apparatus of the previous objects a microcomputer for receiving two digit binary encoded signals that recognized the transistions between the signals to increase the number of recognized rotational positions of an internal combustion engine crankshaft or camshaft for providing signals in proper sequence to the engine cylinders, adjusted in timing relative the piston top dead center position according to engine rpm and other engine operating, ambient, and fuel exhaust conditions.

A further object of this invention is to provide in the apparatus of the previous objects a system for verifying correct shaft rotational direction.

These and other objects will become more apparent in the following description of a preferred embodiment in connection with the following drawings.

DESCRIPTION OF A PREFERRED EMBODIMENT

Figure 1:
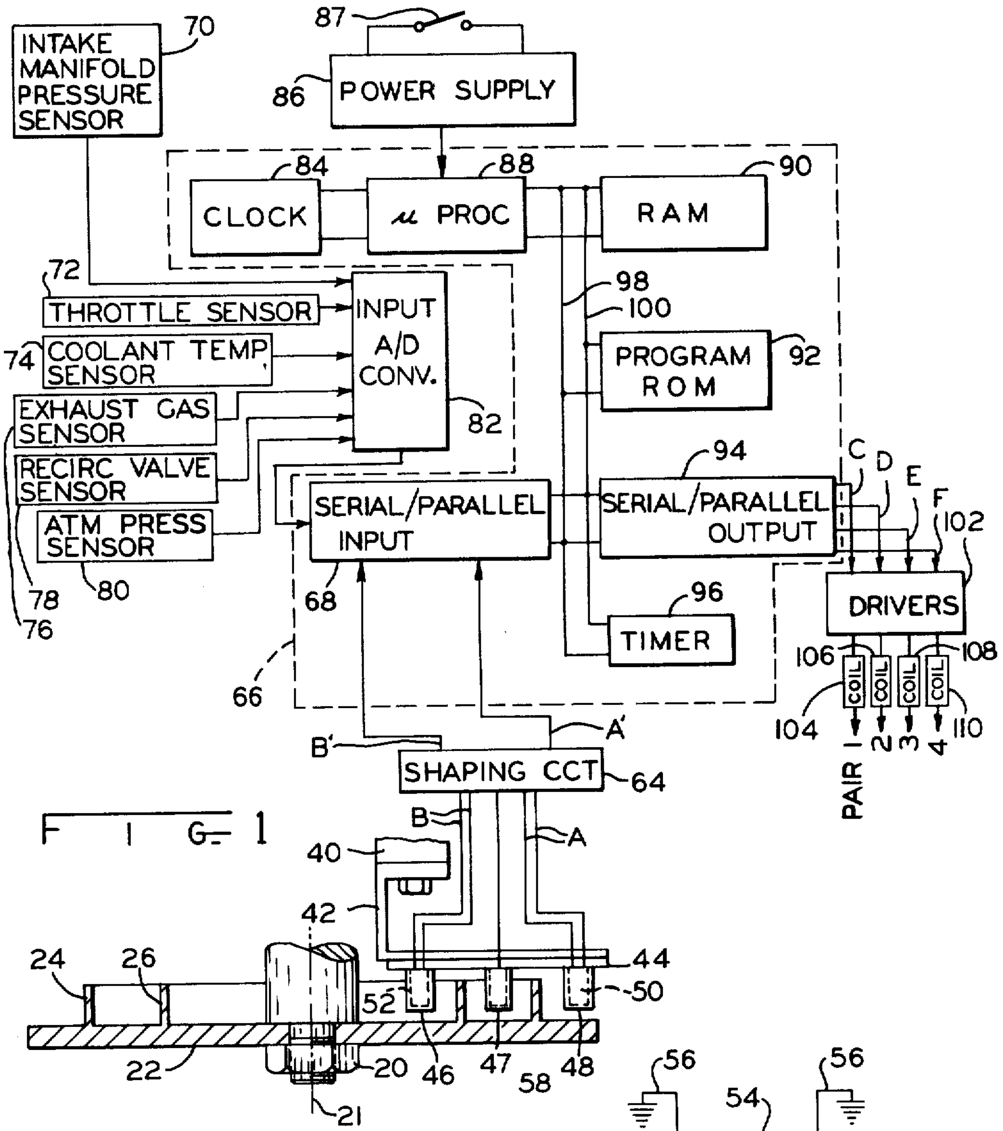
FIG. 1 is a top plan view of a disk and sensor assembly and a schematic diagram of the processing circuitry for an internal combustion ignition system made according to the present invention.
Figure 2:
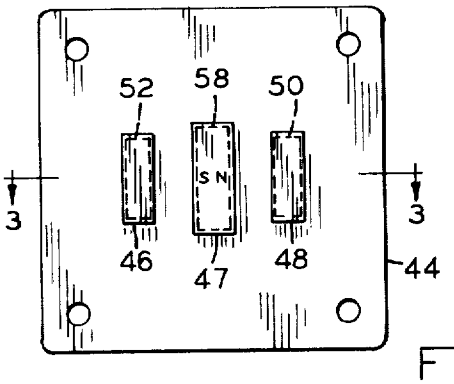
FIG. 2 is an enlarged side elevational view of the sensor assembly of FIG. 1.

Referring to FIGS. 1–4*a*, shaft 20, rotatable about axis 20, which in this embodiment is a crankshaft extension in an internal combustion automotive engine, has fastened to the end thereof a ferrous disk 22. Outer and inner circular rims 24, 26 project from a surface of disk 22. Outer rim 24 has arcuate notch 28 defined by edges 28*a*, 28*b*, and notch 30 defined by edges 30*a*, 30*b*, and inner rim 26 has arcuate notches 32 defined by edges 32*a*, 32*b*, notch 34 defined by edges 34*a*, 34*b*, and notch 36 defined by edges 36*a*, 36*b*. The notches are cutout portions of their respective rims.

An engine mounted post 40 has fastened thereto a non-ferrous bracket 42. A non-ferrous plate 44 has three capsule like pockets 46, 47, and 48 extending from a surface thereof in radially spaced alignment from axis 21. Hall-effect sensors 50, 52 are inserted in pockets 46, 48, respectively, and thus are supported in radially spaced relation from one another. Sensors 50, 52 are well known in the art and when provided with an electrical current in a first direction and a magnetic field in a second direction transverse to the first direction, develop a voltage difference in a third direction that is normal to both the first and second directions, and having a polarity corresponding to current and field polarities.

Voltage source 54 and ground 56 are electrically coupled across each of sensors 50, 52 to provide a current therethrough in the first direction. Permanent magnet 58 is inserted in and supported by pocket 47, and thus is positioned between sensors 50, 52, and has its north pole facing sensor 50 and its south pole facing sensor 52 to provide a magnetic field through the sensors in the second direction.

Radial space or air gap 60 is between magnet 58 and sensor 50 and radial space or air gap 62 is between magnet 58 and sensor 52. The radial centers of gaps 60, 62 are at the same radii, respectively, as the radii of rims 24, 26 which are rotated therethrough upon rotation of disk 22. The radial dimension of gaps 60, 62 are sufficiently short relative to their axial dimension to provide a substantial magnetic field through sensors 50, 52 when a notch is in the gap. Rims 24, 26 extend from disk 22 a distance to effectively shunt the magnetic field in gaps 60, 62, respectively, to provide a return flux path to magnet 58 through disk 22. Output lines A, B are connected across sensors 50, 52, respectively, in the third direction.

Thus, as disk 22 rotates, rims 24, 26 pass through gaps 60, 62, respectively, shunting the magnetic field in the gaps. As disk 22 turns, and either of notches 28, 30 are positioned in gap 60, and any of notches 32, 34, 36 are positioned in gap 62, the magnetic field is not shunted to sensors 50, 52, respectively, and an output appears on leads A and B, respectively.

Figure 4:
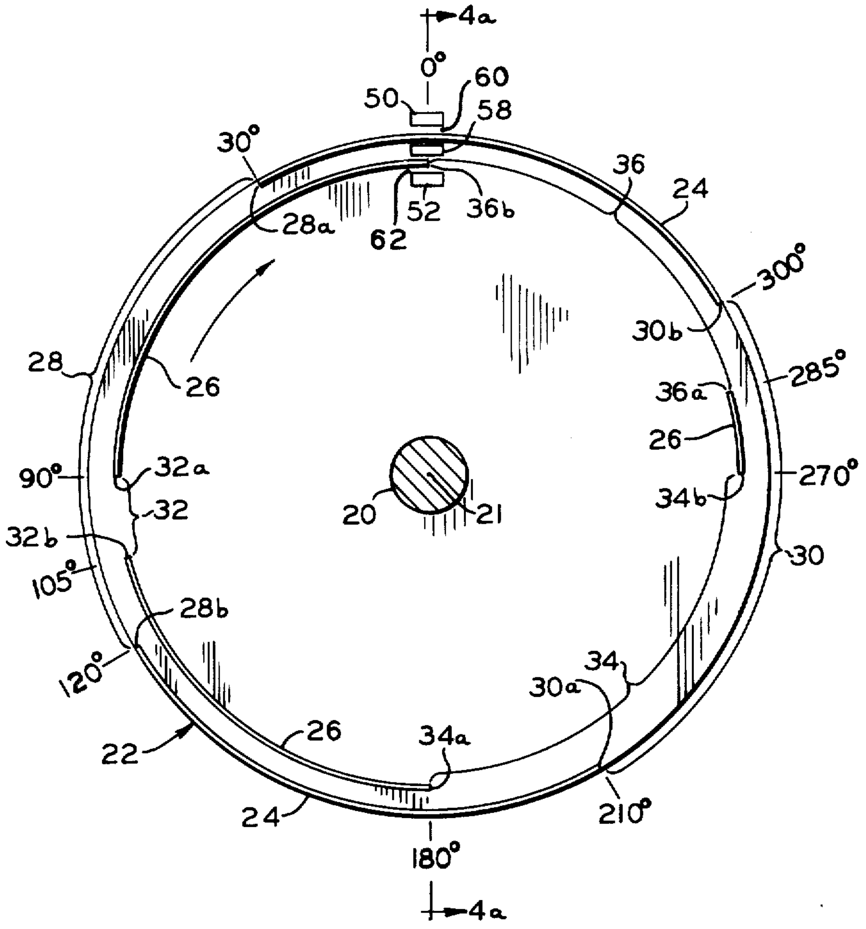
FIG. 4 is an enlarged side elevational view of the disk of FIG. 1.
Figure 4A:
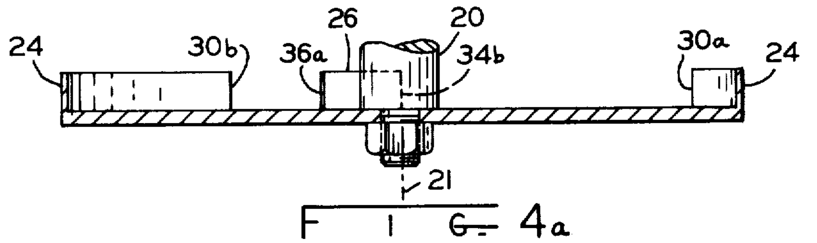
FIG. 4*a* is a section taken at 4*a*—4*a* of FIG. 4.

Referring to FIG. 4 notch 28 extends from 30° to 120°; notch 30 from 210° to 300°; notch 32 from 90° to 105°; notch 34 from 180° to 270°; and notch 36 from 285° to 360°. As will become apparent, this notch spacing provides signals to microcomputer circuitry, later described, for providing the objects of this invention.

Figure 5:
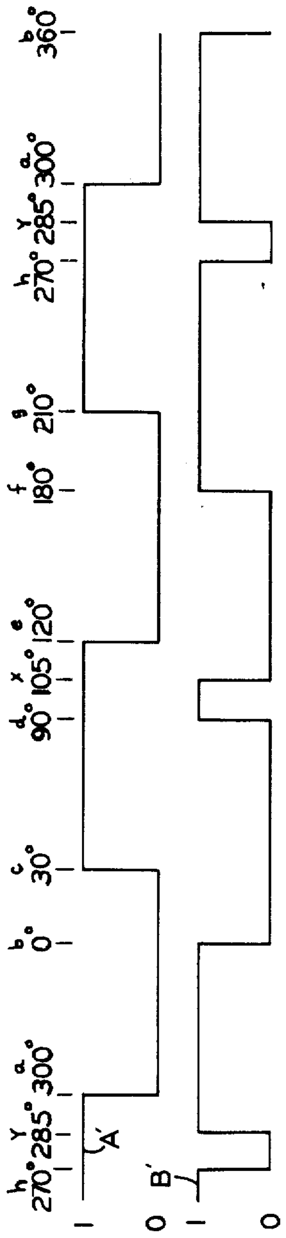
FIG. 5 is a set of output waveforms of the disksensor assembly taken at points A' and B' of the circuit of FIG. 1.

Lines A and B are coupled to shaping circuit 64 where the waveform transitions between high and low outputs are squared, as in the waveforms of FIG. 5. Lines A', B' couple the output from circuit 64 to serial/parallel input circuit 68 of microcomputer 66, shown in dashed lines, and available from Motorola with part no. MC 6801. Other inputs, as analog inputs from intake manifold pressure sensor 70, throttle position sensor 72, coolant temperature sensor 74, exhaust gas chemical content sensor 76, recirculation valve sensor 78, atmospheric pressure sensor 80, and others, are coupled to analog to digital converter 82, which in turn is coupled to circuit 68.

Clock 84 and power supply 86, which may be the vehicles power supply, are coupled to the input of microprocessor 88. Power supply 86 has on-off switch 87, which may be the vehicle ignition switch. Processor 88 has its output coupled to random access memory (RAM) circuit 90, read only memory (ROM) circuit 92, serial/parallel output circuit 94, and timer 96 on lines 98, 100, which also serve to cross couple the inputs and outputs of circuits 90, 92, and 96 and couple the outputs of circuits 90, 92, and 96 to the input of circuit 94 in a manner as will become apparent in the following description. The output of circuit 94 is coupled to the input of coil driver circuit 102 which has its output coupled to spark ignition coils 104, 106, 108, and 110 by lines C, D, E, and F, respectively. Driver circuit 102 may incorporate separate coil drives for each of coils 104, 106, 108, and 110.

Figure 6:
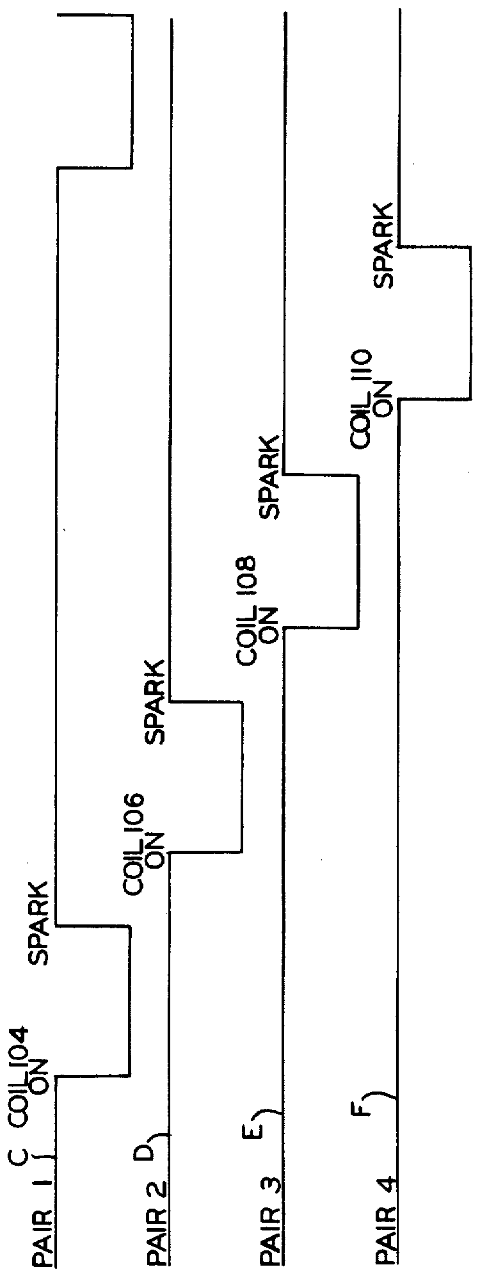
FIG. 6 is a set of output waveforms taken at points C, D, E, and F of the circuit of FIG. 1.

Referring to FIGS. 5 and 6 the waveforms on lines A', B', C, D, E, and F are shown. Waveforms A', B' are generated as disk 22 is rotated by shaft 20 past sensors 50, 52 and waveforms C, D, E, and F are the drive waveforms to the vehicle engine spark ignition coils, and are shown for a low engine speed mode, it being understood that as engine operating conditions are sensed and as engine rpm increases, circuit 66 will change waveforms C, D, E, and F accordingly to achieve desired coil dwell time and ignition timing for optimum engine performance.

In FIG. 5, waveform A' is the shaped output of sensor 50 for the rotational positions of shaft 20 shown along the horizontal or X axis and has negative going edge a at 300° positive going edge c at 30° negative going edge, e at 120°, positive going edge g at 210°, and negative going edge a at 300°, with the "high" level between points c-e and g-a being at a binary "1", and the low level between points a-c and e-g being at a "0" level, as shown on the vertical or Y axis. Thus, when rim 24 is between sensor 50 and magnet 58 shunting the field therebetween, low level a-c or e-g is on line A' and when notches 28, 30 are between sensor 50 and magnet 58, high levels c-e and g-a, respectively, are on line A'.

In similar manner, when rim 26 is between sensor 52 and magnet 58, shunting the field therebetween, a low output b-d, x-b, or h-y is on line B' and when notches 32, 34, and 36 are between sensor 52 and magnet 58, high levels d-x, f-h and y-b are, respectively, on line B'. Disk 22 is designed to provide signals for a 4/8 cylinder engine and other disks may be used for other engines. A disk for a 6 cylinder engine will be later described.

The function of computer 66 in processing waveform signals A', B' will now be described. From the two signals, computer 66 is able to provide four coil driver signals C, D, E, and F having advance-retard and dwell time characteristics corresponding to engine rpm and operating conditions, as will be described. Computer 66 can distinguish predetermined rotational positions of shaft 20 to provide corresponding signals for the four drive coils at such predetermined positions. In the following description, low levels will be referred to as "low" or "0" and high levels will be referred to as "high" or "1". For each rotational position of shaft 20, two levels will be given, the first designating the level of waveform A' and the second designating the level of waveform B'. Thus, just prior to 0° of shaft rotational position, the levels would be 0,1 and just after 0°, the levels would be 0,0. At 0°, the levels would also be 0,0 since waveform A' is at "0" and waveform B' is negative going to "0". Similarly, point c, or 30°, would be designated 1,0, since waveform A' is positive going to "1", and waveform B' is at "0".

Computer 66 recognizes transitions from one combination of levels to a second combination of levels to determine shaft rotational position. Thus the transition from 0,0 to 1,0 signifies that the shaft is at 30°; from 1,0 to 0,0 signifies 120°; from 0,1 to 1,1 signifies 210°; and from 1,1 to 0,1 signifies 300°. At each of these positions, a coil is energized by the coil driver 102, when the information to the computer 66 does not otherwise alter to coil "on" positions. It should be noted at this point that four coil signals are adequate in a four stroke eight cylinder even firing engine in a so-called and well-known "waste spark" manner where the cylinders are grouped in pairs, with one coil delivering a spark to each cylinder in a pair simultaneously; one cylinder in a pair receives a spark after a compression stroke to ignite the mixture to provide a power stroke and the other cylinder in the pair simultaneously receives a waste spark after its exhaust stroke. The cylinders in each of the pairs are so provided with simultaneous sparks, with the pairs being fired in a desired sequence.

When the engine is just started, there is a possibility of incorrect direction of rotation of shaft 20, known as "rockback". Computer 66, during low speed engine revolutions, such as engine idle rpm, verifies rotation by examining the binary levels immediately after a negative going signal of waveform A' as at a or e. Waveform B' is then monitored until it changes state between a "1" and a "0", at which time waveform A' is inspected, as at b or f, and if it is still at "0", the shaft rotation direction is correct. However, if waveform A' is at e "1", as at x or y, then shaft rotation is incorrect and the coil driver 102 receives no signal.

Assuming waveform A' is at "0" at b or f, waveform B' is monitored until waveform A' goes to a "1", as at c or g, and if waveform B' has not changed state rotation is in the correct direction. If waveform B' has changed state, as at a or e, then rotation is in the wrong direction and no signal is delivered to coil driver 102.

Assuming waveform B' has not changed state, a final verification is made by monitoring waveform B' until it does change state, as at d or h, and waveform A' is inspected to verify that it is high and, if so, rotation direction is correct and coil drive is permitted. If waveform A' is low, as at b or f, then rotation direction is incorrect and no coil driver signals are generated. Thus correct rotation verification is made in less than 60° of revolution of shaft 20.

During operation of microcomputer 66, processor 88 comes out of idle mode during each negative going edge of waveform A' and the contents of counter or timer 96 is stored in RAM 90 and timer 96 is re-initialized to again start the count of clock 84. Since negative going edges of waveform A' are 180° apart, the count of clock 84 between such edges will be inversely proportional to shaft 20 rpm and thus shaft rpm is determined.

In the heretofore disclosed embodiment of the invention, there are four coils 104, 106, 108, and 110 and each coil provides a spark to a pair of spark ignition devices, such as the conventional spark plugs, not shown, with the pairs being selected in the aforementioned "waste spark" manner. The coils are energized by signals provided by microcomputer 66 to coil driver 102 in a predetermined relationship to the waveforms A' and B', which relationship is varied by computer 66 according to engine rpm and other conditions such as engine intake manifold pressure, exhaust gas condition, ambient pressure, throttle position, coolant temperature, and others, which are sensed and fed to computer 66. The waveforms C, D, E, and F in FIG. 6 are for just one set of conditions, it being understood that the waveforms are constantly changing in relation to waveforms A', B' during engine operation. Driver 102 inverts and amplifies the waveforms C, D, E, and F so that the "on" edges of the waveforms to the coils are positive going and the "spark" edges are negative going, to provide the high voltage spark to the spark plugs as is well known in the art. The coil "dwell" time is the time that the coil is "on".

Waveforms C, D, E, and F represent signals to coils 104, 106, 108, and 110 respectively, and, as shown, coil 104, waveform C, is "on" at a 300° shaft position and "off" at a 0° shaft position.

For coil 106, waveform D, "on" is at 30° and "spark" is at 90°; for coil 108, waveform E, "on" is at 120° and "spark" is at 180°; and for coil 110, waveform F, "on" is at 210° and "spark" is at 270°. These waveforms are typically for low speed operation, and as the engine operating conditions change, and as shaft 20 rpm changes, as sensed by computer 66, the coil "on" and "spark" times are correspondingly changed to advance the spark and adjust the dwell time in a predetermined manner, for which computer 66 is programmed, thus providing optimum performance, economy, and exhaust pollutant control. For a four cylinder engine, four coils would provide only one spark each to a corresponding spark ignition device. In an even firing four cylinder engine, only two coils are required.

Before describing a typical computer sequence for a 4/8 cylinder engine, the components and functions of computer 66 will be considered. Clock 84 provides clock pulses of a predetermined frequency to microprocessor 88. Waveforms A', B' and inputs from analog to digital converter 82 are fed to input circuit 68 where the information is placed in a format usable by the other components in the computer 66. The program used by computer 66 is stored in ROM 92 which instructs and sequences the calculations and processing in processor 88 of the input data from input circuit 68. The received data is addressed and stored in RAM 90 for use by processor 88 at the appropriate time. Timer 96 is reinitialized periodically upon instructions from processor 88. Processor 88 calculates the advance and dwell time of coils 104, 106, 108, and 110 based on the received data. Output circuit 94 receives coil drive input from processor 88 and provides waveforms C, D, E, and F. Processor 88 alternately computes and waits for sensor inputs, and is able to perform the necessary calculation for a range of 0–40,000 rpm of the shaft.

In the following description of a typical computer sequence, the following definitions will be used:

Reset: all information is cleared from RAM 90 and timer 96, and all drivers are turned off.

Low speed mode: the computer mode when engine rpm is in the range from zero to a predetermined speed such as engine idle. In this mode, no ignition advance-retard or dwell computations or instructions are made.

High speed mode; Engine rpm above the low speed mode operation.

Mated coil driver: The next coil driver in the sequence of firing.

Master: waveform A'

Slave: waveform B'

Edge: The point at which there is a level change in waveforms A' (master) or B' (slave).

Negative edge: The shaft revolution position at which there is a level change from a "1" to "0" level in waveforms A' (master) or B' (slave).

Positive edge: The shaft revolution position at which there is a level change from "0" to "1", in waveforms A' (master) or B' (slave).

Delay time: Change in shaft revolution position between master edge and slave edge as calculated by processor 88 from engine rpm, and other engine operating conditions.

Engine period: Time for one revolution of the shaft.

From the time the vehicle engine is started, the following programmed sequence of steps takes place, from the program stored in ROM 92:

| | | |
|---|---|---|
| Step 1: | a. | Reset |
| | b. | Turn off all drivers |
| | c. | Select low speed mode |
| | d. | Start clock 84 and count clock pulses in timer 96. |
| Step 2: | a. | Wait for a negative edge, a or e, of master. |

-continued

| | | |
|---|---|---|
| | b. | If slave is not at different level than previous negative edge a, e, on master, then ignore edge and restart Step 2. |
| | c. | Store count of time 96 and restart count in timer 96. |
| | d. | Turn on driver 102 to drive either coil 104 or coil 108, depending on whether the master negative edge is a or e, respectively. |
| Step 3: | a. | If computer is in low speed mode, then skip to Step 4. |
| | b. | Wait for previously calculated delay time (Step 7). |
| | c. | Turn off driver 102 drive to coil selected in Step 2. |
| | d. | Turn on mated driver. |
| Step 4: | a. | Wait until next edge occurs on slave. |
| | b. | If master is not at a low, or "0", level, then ignore edge in Step 4 a. and restart Step 4. |
| | c. | Turn off driver selected in Step 2. |
| Step 5: | a. | Wait for positive edge, c or g, on master. |
| | b. | If slave is not at different level than it was at in Step 2, then ignore edge in Step 5. a. and restart. |
| | c. | Turn on driver 102 to drive either coil 106 or 110, depending on whether positive edge in Step 5. a. was at c or g, respectively. |
| Step 6: | a. | If low speed mode, skip to Step 7. |
| | b. | Wait for previously calculated delay time (Step 7). |
| | c. | Turn off driver 102 drive for the coil selected in Step 5 c. |
| | d. | Turn on mated driver. |
| Step 7: | a. | Perform spark advance calculation according to engine rpm determined by count in Timer 96 and program in ROM 92. |
| | b. | Perform calculation to determine engine operating condition information from converter 82. |
| | c. | Perform spark advances calculation from information from A/D convertor 82, according to program in ROM 92. |
| Step 8: | | If in low speed mode, turn off driver 102 drive to the coil selected in Step 5. c. |
| Step 9: | a. | If in high speed mode, then skip to Step 10. |
| | b. | Wait for next edge on slave. |
| | c. | If master is not high, then ignore edge in Step 9. b. and restart Step 9. |
| | d. | Turn off driver 102 drive to coil selected in Step 5. c. |
| Step 10: | a. | Compare engine period to low-high speed mode threshold to ROM 92 to select high or low speed mode according to engine period. |
| | b. | Go to Step 2 and repeat procedure. |

The above sequence performs the aforementioned monitoring to determine correct rotational direction and performs the calculations of the input data to determine the spark advance and dwell time for optimum engine performance.

Figure 7:
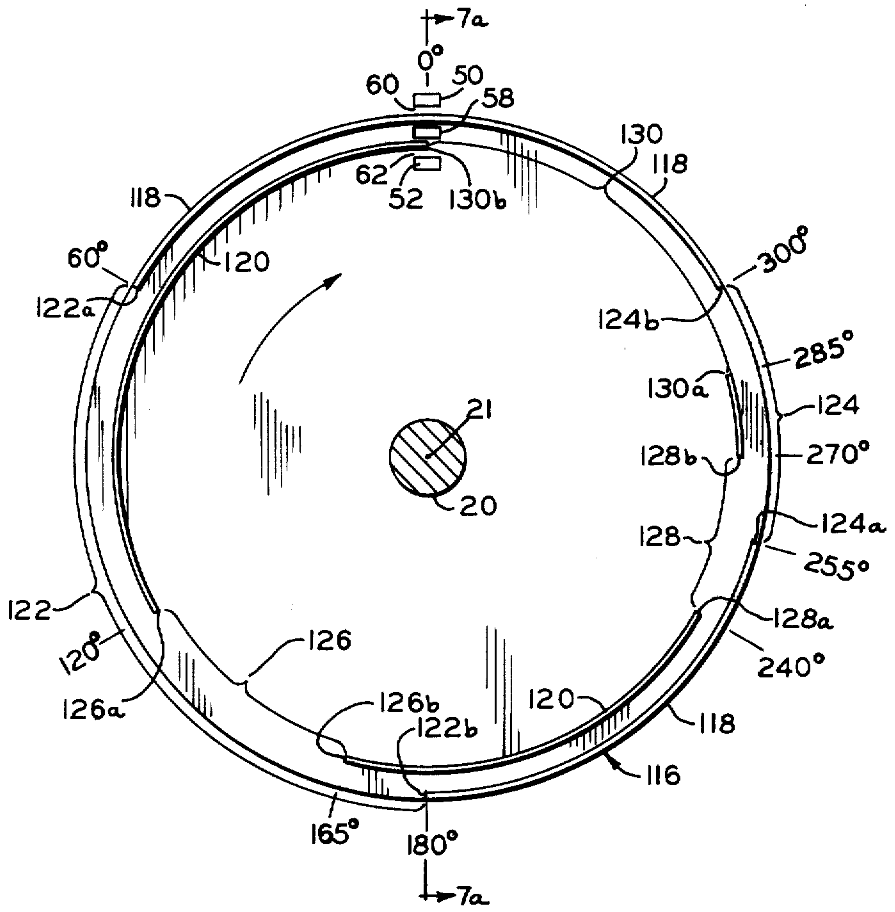
FIG. 7 is a side elevational view of a disk for use in a six cylinder internal combustion engine.
Figure 7A:
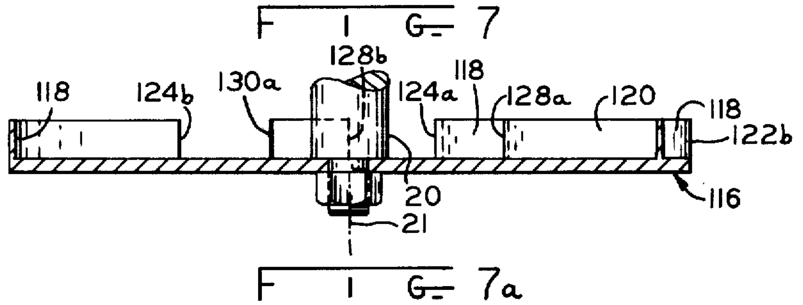
FIG. 7*a* is a section taken at 7*a*—7*a* of the embodiment of FIG. 7.

Referring to FIGS. 7 and 7*a*, a disk for use with sensors 50, 52 and associated electronic circuitry for a six cylinder engine will be described. Disk 116, of ferrous material, is attached to and rotatably driven by shaft 20 and has outer circular rim 118, and inner circular rim 120 projecting from one face thereof. The radii of rims 118, 120 from the axis 21 of shaft 20 correspond to the radii of gaps 60, 62, respectively, and pass freely therethrough upon shaft rotation. Rims 118, 120 project into gaps 60, 62 sufficiently to effectively shunt the gap flux back to magnet 58 before the flux permeates sensors 50, 52.

Arcuate notch 122, defined by edges 122a, 122b and notch 124, defined by edges 124a, 124b are formed in rim 118, with notch 122 extending from 60°-180° of angular arc about axis 21 for a given rotational position of disk 116, and notch 124 extending from 255°-300°. Arcuate notch 126, defined by edges, 126a, 126b, notch 128, defined by edges 128a, 128b, and notch 130, defined by edges 130a, 130b, are formed in rim 120 with notch 126 extending from 120°-165°, notch 128 extending from 240°-270°, and notch 130 extending from 285°-360°.

Figure 3:
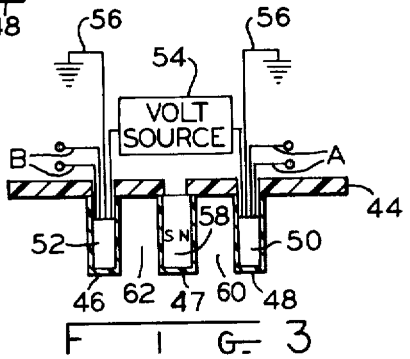
FIG. 3 is a section taken at 3—3 of FIG. 2.

As disk 116 rotates, waveforms A', B', FIg. 3 are generated in the manner that waveforms A', B', FIG. 5 are generated when a notch is between its repective sensor and magnet 58, and a binary "0" is generated when a rim portion is between its respective sensor and magnet 58. Two digit binary outputs are provided to microcomputer 66 which provide signals to coil driver 102 in the manner of the previous embodiment but with exception there are only three coils for delivering cylinder pair ignition spark signals, in the case of a six cylinder engine, or for delivering single spark ignition signals in the case of a three cylinder engine. As in the previous embodiment, transitions from a first two bit, or binary digit, signal to a second two bit signal is detected, to increase the number of rotational positions that can be detected for a given number of notch edges.

Figure 8:
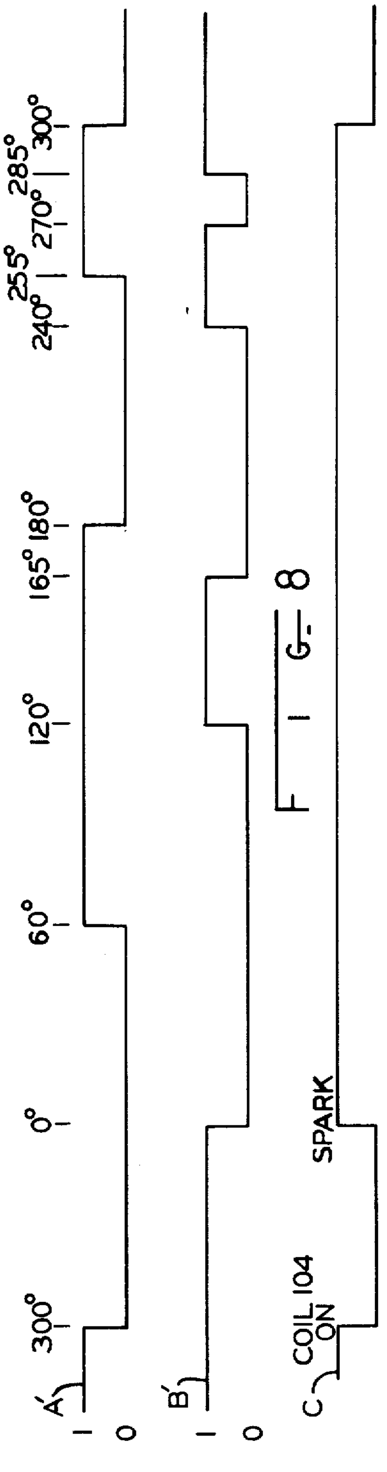
FIG. 8 is a set of waveforms from the sensors taken at points A' and B' in FIG. 1 when the disk of FIG. 7 is used in the embodiment of FIG. 1.
Figure 9:
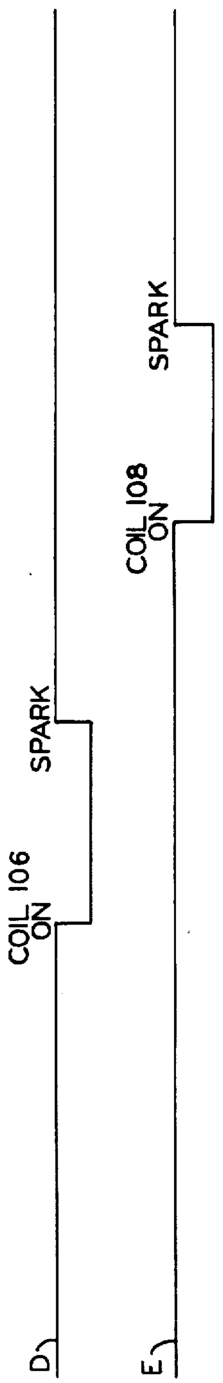
FIG. 9 is a set of waveforms taken at points C, D, and E in FIG. 1 to the coil driver when the disk of FIG. 7 is used in the embodiment of FIG. 1.

Referring to FIGS. 8 and 9, waveforms A', B', from shaping circuit 64 or generated by sensors 50, 52 when disk 116 is used in this invention. In the 0° position of disk 116 shown in FIG. 7, rim 118 is in gap 60 between sensor 50 and magnet 58, shunting the magnetic field therebetween, so that waveform A' is at a "0" level. The edge between notch 130 and rim 120 is just entering gap 62 between sensor 52 and magnet 58, for clockwise rotation of disk 116, and the field therebetween is becoming shunted and waveform B' is going from a "1" to a "0". As mentioned, shaping circuit 64 provides a substantially square edge during this transition, and may be incorporated as part of monolithic circuitry associated with sensors 50, 52.

Continued clockwise rotation of disk 116 will place rims 118, 120 in gaps 60, 62, respectively, with the levels of waveforms A' and B' being at 0,0, respectively, for a binary input of 0,0 to computer 66. At 60°, notch 122 enters gap 60, for a binary input of 1,0; at 120° of rotation, notch 126 enters gap 62 for a 1,1 input; at 165° of rotation, rim 120 enters gap 62 for a 1,0 input; at 180°, rim 118 enters gap 60 for a 0,0 input; at 240° of rotation, notch 128 enters ap 62 for a 0,1 input; at 255° of rotation, notch 124 enters gap 60 for a 1,1 input, at 270°, rim 120 enters gap 62 for a 1,0 input; at 285°, notch 130 enters gap 62 for a 1,1 input; and at 300°, rim 118 enters gap 60 for a 0,1 input.

Figure 10:
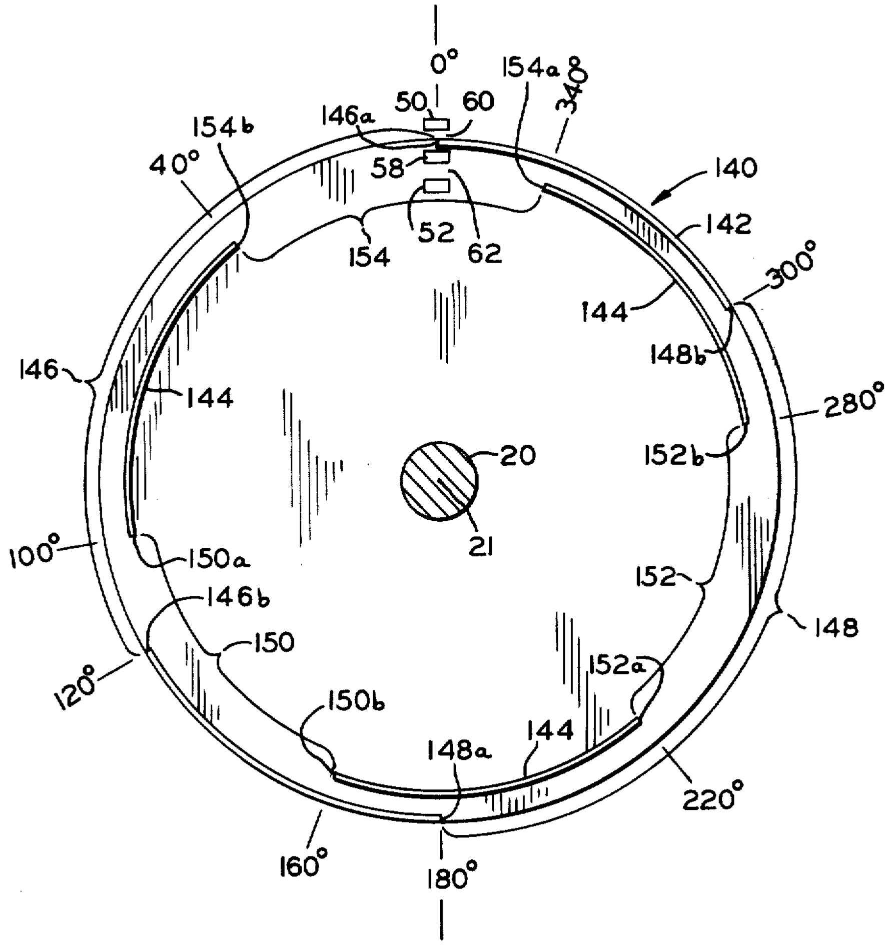
FIG. 10 is a side elevational view of a disk and sensors for use in a four cylinder internal combustion engine.
Figure 11:
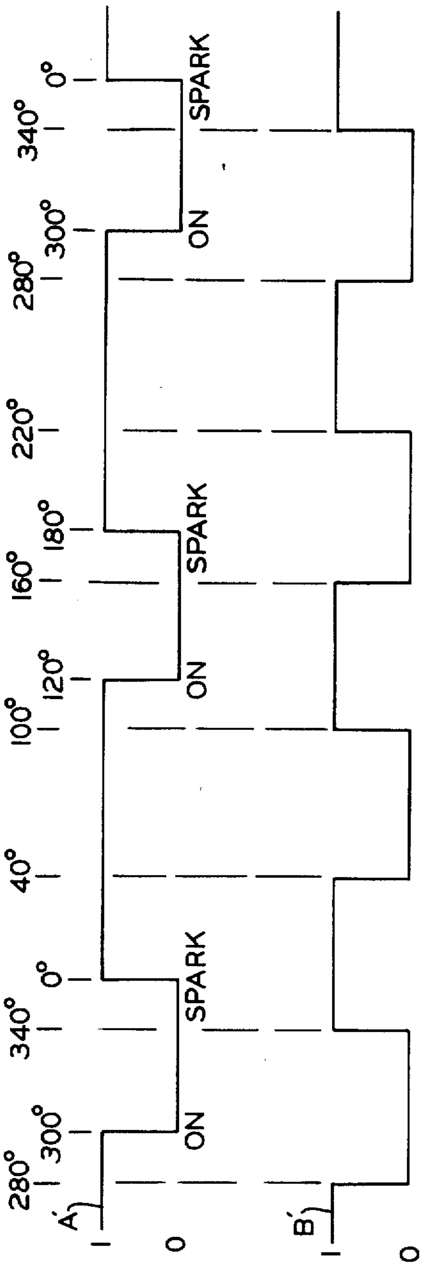
FIG. 11 is a set of waveforms taken at the outputs of the sensors in the embodiment of FIG. 10.

Referring to FIGS. 10, 11, a disk and waveforms for a four cylinder engine are disclosed. Ferrous disk 140 is attached to and rotatably driven by shaft 20 and has outer circular rim 142 and inner circular rim 144 projecting from one face thereof. The radii of rims 142, 144 from axis 21 of shaft 20 correspond to the radii of gaps 60, 62, respectively, and pass freely therethrough on shaft rotation. Rims 142, 144 project into gaps 60, 62 sufficiently to effectively shunt the gap flux back to magnet 58 before the flux permeates sensors 50, 52.

Arcuate notch 146, defined by edges 146a, 146b, and notch 148, defined by edges 148a, 148b are formed in rim 142, with notch 146 extending from 0°-120° of angular arc about axis 21 for a given rotational position of disk 140, and notch 148 extending from 180°-300°. Arcuate notch 150, defined by edges 150a, 150b, notch 152, defined by edges 152a, 152b and notch 154, defined by edges 154a, 154b are formed in rim 144, with notch 150 extending from 100°-160°, notch 152 extending from 220°-280°, and notch 154 extending from 340°-40°.

As disk 140 rotates, shaped waveforms A', B', FIG. 11 are generated from sensors 50, 52, respectively. In waveform A', a binary "0" is generated when rim 142 is in region 60 and a binary "1" is generated when a notch is in region 60. Similarly, for waveform B', a "0" is generated when rim 144 is in region 62 and a "1" is generated when a notch is in region and a "1" is generated when a notch is in region 62. As before, the two digit binary outputs are provided to microcomputer 66 which provides signals to coil driver 102, with the exception that the coil "on" and "spark" signals are determined by waveform A', with the "on" signals being at negative going edges and the "spark" signals being at positive going edges. Waveform B', in this rotor embodiment, and associated circuitry, provides information for rotation direction and position. Rotor 140 has balanced notch and rim portions in both rims 142, 144 and therefore has superior mechanical balance during rotation. As in the previous embodiments, sensor 50, 52 outputs may be inverted for particular microcomputer requirements, in any of the manners stated. As before, for an even firing engine, only two coils are utilized and for an uneven firing engine, four coils are utilized.

For four and six cylinder operation, a different program in ROM 92 is used, while the other componentry in FIG. 1 remains substantially the same, and computer 66 recognizes the transitions between the two bit inputs. For six cylinder operation, three coil driver waveform inputs C, D, and E as shown in FIG. 9 are provided. Driver 102 inverts and amplifies these waveforms and energizes coils 104, 106, and 108 which, respectively, provide high voltage spark ignition signals to pairs of even firing cylinders. Computer 66 in similar manner to that for the previous embodiment provides advance-retard and variable dwell time of the coil drive waveforms C, D, and E according to engine operation condition, including computer derived shaft rpm.

This invention provides an ignition system that allows no more than one cylinder to go through a power stroke, in a four-stroke cycle, without receiving a spark ignition signal; detects incorrect crankshaft rotation in less than 60° of shaft rotation; utilizes a two bit signal from two Hall-effect sensors to determine coil "on" and coil "off", or sparks, signals for each coil; and minimizes the number of flux changes required for two magnetic sensors by detecting the instantaneous set of sensor outputs, as well as the next previous set of sensor outputs, without reference to time measurements.

As an example of the last mentioned advantage of this invention, reference is made to FIGS. 5 and 6. Eight unique signals are obtained to turn four coils 104, 106, 108, and 110 "on" and "off" from only two bits of information. This is possible since at each coil "on" position, not only are the instantaneous condition of waveforms A', B', considered, but the next previous condition is also considered to provide a coil "on" signal. For example, for coil 104, the set of binary signals for the previous condition and instant condition at point "a" in the waveforms is 1,1 and 0,1, respectively, which set is unique and coil 104 is turned "on". Once a coil is "on", it is positive going or negative going. As mentioned, in the high speed mode of the computer 66, the coil "on" and "off" points are changed relative to waveforms A', B' according to engine rpm and other operating conditions.

A disk for a 4 cylinder engine, a 4/8 cylinder engine and a 6 cylinder engine are disclosed that have inner and outer projecting rims, each with notches of predetermined arcuate length and angular position to provide the necessary information of shaft rotational position to provide coil spark signals and dwell time for optimum engine performance. The outer rim has two notches and the inner rim has three notches.

It is possible to invert each of waveforms A, B by interchanging the notches and rim portions. Thus, by placing a rim portion where there is a notch, and placing a notch where there is a rim portion, the outputs would be inverted.

Various combination of shunts and gaps may be provided to obtain desired outputs. Multiple digit binary codes, including two digit outputs, may be provided by utilizing multiple shunting members, such as notched rims or channel sides, and a corresponding number of magnets and sensor devices to sense the presence and absence of each notch. The magnets and sensors may conveniently be supported in a single package in substantial alignment along a line transverse to the notched rims or sides. For example, for a three digit binary signal, three rims or sides, with associated field producing means and sensor means, would be utilized.

While there have been described above the principles of this invention in connection with specific apparatus, it is to be understood that this description is made only by way of example and not as a limitation to the scope of the invention, which is defined in the following claims.

What is claimed is:

1. Rotational position sensing and output apparatus for a shaft rotatable about an axis for sensing a predetermined number of rotational positions of said shaft, comprising;

first means for generating a predetermined number of two digit binary signals corresponding to the predetermined number of rotational positions of said shaft;

second means for receiving said signals and for providing a predetermined number of separate binary waveforms each having at least two transitions between "0" and "1" for each revolution of said shaft;

said second means comprising means for recognizing transitions from one two digit binary signal to another two digit binary signal whereby additional rotational positions of the shaft are recognized;

said first means comprises a disk rotatably driven by the shaft;

first and second circular rims of magnetic field shunting material projecting from one side of said disk; said first and second rims being concentric with the shaft axis and having first and second radii, respectively;

first notches, each of predetermined arcuate length and angular position being formed in said first rim and second notches each of predetermined arcuate length and angular position being formed in said second rim;

a magnet having north and south poles being mounted in fixed relation to and on a radius of the axis of said shaft;

a first Hall-effect sensor, having an output, being mounted in fixed relation to the shaft axis and on said radius and being radially spaced from said north poles to define a first flux gap;

a second Hall-effect sensor, having an output, and being mounted in fixed relation to the shaft axis and on said radius and being radially spaced from said south pole to define a second flux gap;

said first rim being in radial registration with said first gap, and said second rim being in radial registration with said second gap;

said first and second rims passing freely through said first and second gaps, respectively, upon shaft rotation, causing the outputs of said Hall-effect sensors to alternate between binary level "1" and binary level "0" as a notch or rim passes through their respective gaps.

2. The apparatus of claim 1 wherein said first rim has a first notch, one of said first rim and notch extending in an arc of 30°-120° about said axis and a second notch, one of said first rim and second notch extending in an arc of 210°-300° about said axis;

said second rim has a first notch, one of said second rim and its first notch extending in an arc of 90°-105° about said axis; a second rim second notch, one of said second rim and its second notch extending in an arc of 180°-270° about said axis, and a second rim third notch, one of said second rim and its third notch extending in an arc of 285°-360° about said axis.

3. The apparatus of claim 1 wherein said first rim has a first notch, one of said first rim and its first notch extending in an arc of 60°-180° about said axis and a second notch, one of said first rim and its second notch extending in an arc of 255°-300° about said axis;

said second rim has a first notch, one of said second rim and its first notch extending in an arc of 120°-165°, a second rim second notch, one of said second rim and its second notch extending in an arc of 240°-270°, and a second rim third notch, one of said second rim and its third notch extending in an arc of 285°-360°, about said axis.

4. The apparatus of claim 1 wherein said second means comprises a microcomputer having inputs and outputs, said microcomputer inputs being coupled to said Hall-effect sensor outputs to receive sensor signals;

a drive means for providing drives to a plurality of internal combustion engine spark coils; said drive means being coupled to said microcomputer outputs, to receive drive signals therefrom;

said microcomputer having first means for processing said Hall-effect sensor signals to provide said drive means with said drive signals to drive said coils, said drive signals varying each coil "on" time and the dwell time for each coil in a predetermined relation to disk rpm.

5. The apparatus of claim 4 wherein said second means microcomputer includes monitoring means for monitoring said Hall-effect sensor signals to determine shaft rotational directional and to inhibit signals to said drive means upon incorrect rotational direction.

6. The apparatus of claim 6 wherein said monitoring means makes said direction determination in less than 60° of shaft rotation.

7. A disk adapted to be mounted for rotation about an axis of an internal combustion engine shaft, comprising first and second coaxial circular magnetic field shunting rims projecting from a disk surface and concentric with the axis and at first and second radii, respectively, from said axis;

said first rim having only two arcuate notches and said second rim having only three arcuate notches.

8. The disk of claim 7 wherein said first rim has a first arcuate notch, one of said first rim and its first notch, extending in an angular arc of 30°-120° about said axis and a second notch, one of said first rim and its second notch extending in an angular arc of 210°-300° about said axis;

said second rim having a first arcuate notch, one of said second rim and its first notch extending in an arc of 90°-105° about said axis, a second rim second arcuate notch, one of said second rim and its second notch extending in an arc of 180°-270° about said axis, and a second rim third arcuate notch, one of said second rim and its third notch extending in an arc of 285°-360° about said axis.

9. The disk of claim 7 wherein said first rim has a first arcuate notch, one of said first rim and its first notch extending in an angular arc of 60°-180° about the axis and a second notch, one of said first rim and its second notch extending in an angular arc of 255°-300° about the axis;

said second rim having a first arcuate notch, one of said second rim and its first notch extending in an angular arc of 120°-165° about the axis; a second rim second arcuate notch, one of said second rim and its second notch extending in an angular arc of 240°-270° about the axis, and a second rim third arcuate notch, one of said second rim and its third notch extending in an angular arc of 270°-285° about the axis.

10. The disk of claim 7 wherein said first rim has a first arcuate notch, one of said first rim and its first notch extending in an angular arc of 0°-120° about the axis and a second notch, one of said first rim and its second notch extending in an angular arc of 180°-300° about said axis said second rim having a first arcuate notch, one of said second rim and its first notch extending in an angular arc of 100°-160°; a second rim second notch, one of said second rim and its second notch extending in an angular arc of 220°-280° about the axis; and a second rim third notch, one of said rim and its third notch extending in an angular arc of 340°-40° about the axis.

11. The apparatus of claims 7, 8, 9, or 10 including field means for providing an electromagnetic field in first and second field regions in fixed relation to said axis and in radial registration with said first and second rims, respectively;

sensor means for sensing the level of electromagnetic field and positioned at said first and second regions and for providing an output corresponding to the sensing of said field;

said first and second rims shunting the field in said first and second regions when in said first and second regions, respectively, to place at a first level the outputs from said first and second sensors, respectively; said outputs being placed at a second level when said notches in said first and second rims are in said first and second regions respectively.

12. The apparatus of claim 11 including computer means coupled to said sensor outputs for processing said outputs to compute disk rpm and to provide an output corresponding to said sensor outputs as varied by said disk rpm.

13. The apparatus of claim 12 including third sensor means coupled to said computer means for sensing at least one of the engine operating conditions of intake manifold pressure, engine throttle position, ambient pressure, coolant temperature, exhaust chemical constituents, and exhaust recirculation valve.

14. The disk of claims 1, 7, 8, 9, or 10 wherein said disk and rims are of a ferrous material.

15. Rotational position sensing and output apparatus for a shaft rotatable about an axis for sensing a predetermined number of rotational positions of said shaft, comprising;

first means for generating a predetermined number of two digit binary signals corresponding to the predetermined number of rotational positions of said shaft;

second means for receiving said signals and for providing a predetermined number of separate binary information trains each having at least one transition between "0" and "1" for each revolution of said shaft;

said second means comprising means for comparing the instantaneous state of each of a set of said information trains with a previous state of each of said set of said information trains to provide an increased number of rotational positions of the shaft that are recognized.

16. The apparatus of claim 15 wherein said previous state is the next previous state.

17. The apparatus of claim 15 wherein there are two information trains in the set and there are eight rotational positions that are recognized.

18. Rotational position sensing and output apparatus for a shaft rotatable about an axis for sensing a predetermined number of rotational positions of said shaft, comprising;

first means for generating a predetermined number of two digit binary signals corresponding to the predetermined number of rotational positions of said shaft;

second means for receiving said signals and for providing a predetermined number of separate binary waveforms each having at least two transitions between "0" and "1" for each revolution of said shaft;

said second means comprising means for recognizing transitions from one two digit binary signal to another two digit binary signal whereby additional rotational positions of the shaft are recognized;

said first means is for generating binary signals of 0,0; 0,1; 1,0; and 1,1 and said second means is for recognizing transitions from 0,0 to 1,0; from 1,0 to 0,0; from 0,1 to 1,1; and from 1,1 to 0,1.

19. Rotational position sensing and output apparatus for a shaft rotatable about an axis for sensing a predetermined number of rotational positions of said shaft, comprising:

first means for generating a predetermined number of two digit binary signals corresponding to the predetermined number of rotational positions of said shaft;

second means for receiving said signals and for providing a predetermined number of separate binary waveforms each having at least two transitions between "0" and "1" for each revolution of said shaft;

said second means includes monitoring means for monitoring said second means waveforms and inspecting the binary states of said waveforms and for determining shaft rotational direction and for generating a signal for inhibiting generation of said second means waveforms upon incorrect shaft rotation direction.

20. The apparatus of claim 19 wherein said monitoring means comprises means for monitoring the binary state of a second of said waveforms upon the change between binary states in a first of said waveforms and then inspecting the binary state of said first waveform upon a change in binary state of said second waveform.

21. The apparatus of claim 20 wherein said monitoring means is for making a final verification that rotation is in the correct rotational direction by monitoring said second waveform until it changes state and then inspecting the binary state of said first waveform.

22. The apparatus of claim 19 wherein said monitoring means is for determining incorrect shaft rotation direction within 75° of all rotations in the incorrect direction, regardless at what shaft rotational position said incorrect rotation direction begins.

* * * * *